(No Model.)
C. C. PECK & W. H. CHAPMAN.
COMMUTATOR FOR ELECTRICAL APPARATUS.
No. 267,711. Patented Nov. 21, 1882.
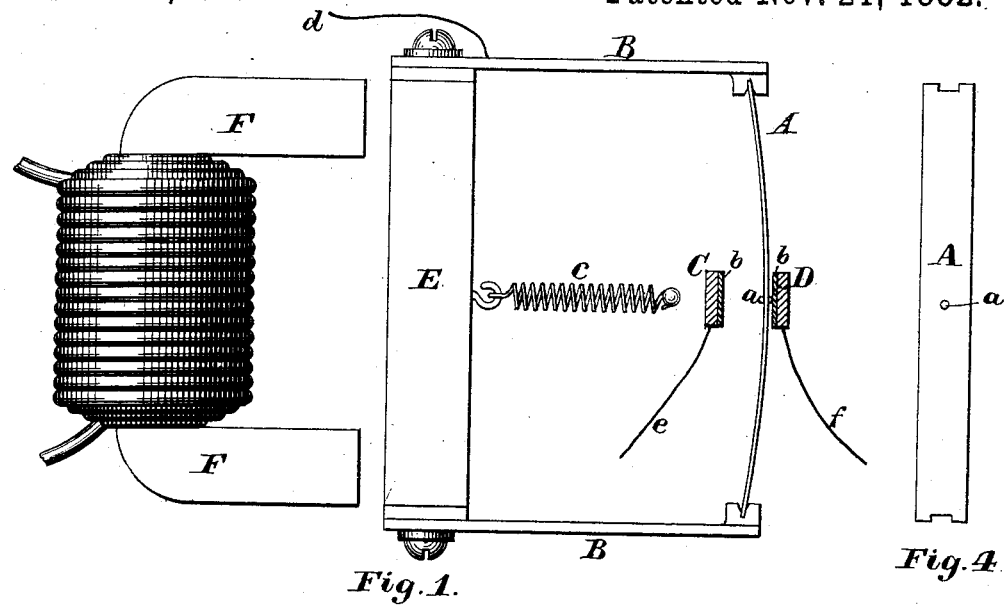
Fig. 1.
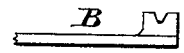
Fig. 5.
Fig. 6.
Fig. 4.
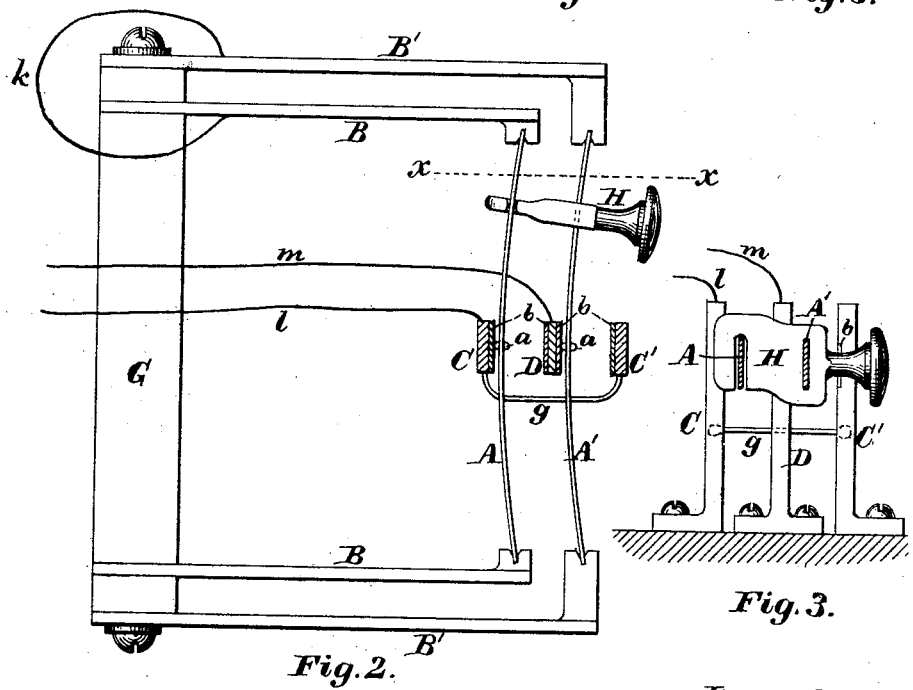
Fig. 2.
Fig. 3.
Witnesses:
E. A. Hemmenway
Walter E. Lombard
Inventors:
Charles C. Peck
Wm. H. Chapman
by N. C. Lombard
Attorney.

UNITED STATES PATENT OFFICE.

CHARLES C. PECK AND WILLIAM H. CHAPMAN, OF MIDDLEBURY, VERMONT.

COMMUTATOR FOR ELECTRICAL APPARATUS.

SPECIFICATION forming part of Letters Patent No. 267,711, dated November 21, 1882.

Application filed April 21, 1882. (No model.)

*To all whom it may concern:*

Be it known that we, CHARLES C. PECK and WILLIAM H. CHAPMAN, of Middlebury, in the county of Addison and State of Vermont, have invented a new and useful Commutator for Electrical Apparatus, of which the following, taken in connection with the accompanying drawings, is a specification.

Our invention relates to a new and improved commutator applicable to various electrical machines or apparatus, and has for its object the production of a novel device, whereby an electric current may be stopped or started, a current may be turned or switched from one course to another, or a current may be reversed, said invention being partially described in another application filed by us February 17, 1882, and numbered 52,929, of which this application is in part a division.

Our invention consists of one or more leaf-springs, held at their opposite ends in two or more elastic or spring supports, and adapted to be curved or bent alternately in opposite directions by the pressure of said spring-supports, so as to make or break electrical connection at proper times with two or more contact points or surfaces.

It further consists in the combination of one or more leaf-springs, two or more spring-supports, two or more contact-surfaces, all as above described, and an electro-magnet and armature, said armature being connected to the spring-supports and adapted to impart to them an intermittent reciprocating motion, as will be further described.

It further consists of two leaf-springs, each held at its opposite ends in a pair of spring-supports and adapted to be bent alternately in opposite directions by the pressure of said supports, two or more contact-surfaces adapted to make or break electrical connection with said leaf-springs, and a link or piece of gutta-percha or other suitable insulating material connecting the two leaf-springs, to cause them both to move at the same time, so that both will be bent in the same direction.

In the accompanying drawings, Figure 1 is an elevation of our improved commutator, employing one leaf-spring, and adapted for making or breaking the circuit or changing the course of an electric current. Fig. 2 is an elevation of our commutator, employing two springs, and adapted for reversing the current. Fig. 3 is a partial section of the same on line $xx$ on Fig. 2. Fig. 4 is an elevation of one of the leaf-springs; and Figs. 5 and 6 are respectively an elevation and end view of the end of one of the spring-supports.

In Fig. 1, A is the leaf-spring, made of thin sheet metal, and having riveted to its center a small piece of platinum, $a$, to serve as a contact-point. The spring A is notched at its ends, and is fitted to notches in the ends of the spring-supports B B, by which it is held and bent or curved in one direction or the other by the tendency of the ends of the supports B B to spring toward each other, thus exerting a pressure upon the ends of the spring A and bringing the platinum point $a$ in contact with one or other of the contact-pieces C and D, which are each faced with a piece of platinum, $b$. The supports B B are each secured at one end to an armature, E, they being properly insulated therefrom, which armature may be alternately attracted toward the poles of an electro-magnet, F, or moved in the opposite direction by the tension of the spring $c$, secured at one end to the armature E and at its opposite end to a suitable fixed point.

In Fig. 1 the contact-pieces C and D are supposed to be stationary, and the spring A is shown as being in contact with the piece D. If, now, the spring $c$ acts to move the armature E and supports B B away from the magnet F, the spring A will be straightened, forcing the ends of the supports B B outward, when a slight further movement will cause the spring A to bend in the opposite direction until it comes in contact with the piece C. If, now, the magnet F act to attract the armature E, the reverse motion will take place, and the spring A will again be brought in contact with the piece D. Three wires, $d$, $e$, and $f$, adapted to convey an electric current, may be connected respectively with one of the supports B, the piece C, and the piece D. With the parts in the positions shown in the drawings, a current of electricity coming through the wire $d$ will pass through the support B, spring A, piece D, and wire $f$. To change the course of the current the spring A is brought in contact with the piece C in the manner previously described, and the current will then pass through the wire $d$, support B, spring A, piece C, and wire e. It is obvious that either of the pieces C or D may be removed, and this device used for simply opening and closing the circuit by making or breaking contact with either of the pieces C or D.

In Figs. 2 and 3 is illustrated our commutator for reversing the current.

A and A' are two leaf-springs, each held in a pair of spring-supports, B B or B' B', which are secured to a fixed piece, G, but are insulated from each other.

C, C', and D are contact-pieces for making connection with the springs A A'. They are faced with platinum b, and the springs A A' are also provided with platinum points a, as before described. The contact-surfaces C and C' should be in one piece, which may be bent into a U shape, or they should be connected by a wire, g, as shown.

H is a piece of gutta-percha or other suitable insulating material, fixed upon the spring A', and surrounding loosely the spring A, its object being to connect said springs, so that they will always move together and make or break contact at the same instant. The piece H is shown as being provided with a knob or handle, which may be pulled or pressed by the fingers to move the springs A A' from one position to the other.

Let k represent a wire connecting the spring-supports B and B', l a wire connecting one pole of a battery or other generator of electricity with the contact-piece C, and m a wire connecting the opposite pole with the contact-piece D.

A current coming from one pole of the battery through the wire l will pass through the contact-piece C, spring A, support B, wire k, support B', spring A', contact-piece D, and thence over wire m to the opposite pole of the battery. If it is desired to make the current pass in the reverse direction through the wire k, the springs A and A' are moved to their opposite positions, the spring A coming in contact with the piece D and the spring A' coming in contact with the piece C'. The current will then pass from the wire l through the contact-piece C C', spring A', support B', wire k, support B, spring A, contact-piece D, and wire m to the battery.

This device is applicable to a great number of different electrical machines where it is desired to reverse the current, it being only necessary, in order to apply it, to place the machine in the circuit of the wire k.

It is evident that instead of imparting motion to the spring-supports, as shown in Fig. 1, or directly to the springs, as in Fig. 2, the motion may be imparted to the contact-pieces themselves and the result will be the same, provided the relative motion is not changed; also, that motion may be derived from any convenient source of power.

What we claim as new, and desire to secure by Letters Patent of the United States, is as follows:

1. A commutator composed of one or more leaf-springs held at their ends in supports adapted to press upon the ends of said springs to cause them to assume a curved or elliptic form, two or more contact-surfaces, and means of reversing the curve of said springs to make and break contact with said surfaces, substantially as described.

2. A commutator composed of one or more leaf-springs held at their ends in supports adapted to press upon the ends of said springs to cause them to assume a curved or elliptic form, and two or more contact-surfaces, in combination with an electro-magnet and its armature, all adapted to operate substantially as described.

3. A commutator composed of two leaf-springs held at their ends in supports adapted to press upon the ends of said springs to cause them to assume a curved or elliptic form, two or more contact points or surfaces, and a piece of gutta-percha or other suitable insulating material connecting said springs, substantially as and for the purposes described.

In testimony whereof we have signed our names to this specification, in the presence of two subscribing witnesses, on this 19th day of April, A. D. 1882.

CHARLES C. PECK.
WM. H. CHAPMAN.

Witnesses:
E. A. HEMMENWAY,
WALTER E. LOMBARD.